United States Patent Office 3,196,168
Patented July 20, 1965

3,196,168
AMINOAROYL AMINOSTEROIDS
Norman H. Grant, Wynnewood, and Harvey E. Alburn, West Chester, Pa., assignors to American Home Products Corporation, New York, N.Y., a corporation of Delaware
No Drawing. Filed Feb. 18, 1964, Ser. No. 345,606
10 Claims. (Cl. 260—397.3)

This invention is directed to novel aminosteroids and more particularly 3α-(aminobenzamido)-5α-pregnan-20-ones, 3α-(aminobenzamido)-5α-pregnan-20-ols and to the method by which these new steroids are prepared.

The new compounds of the present invention considered in their broadest aspect include those compounds encompassed within the following structural formula:

(I)

wherein $R^1$ and $R^2$ are selected from the group consisting of hydrogen, lower alkyl, phenyl, halogen, nitro and sulfo and $R^3$ is selected from the group consisting of hydrogen, lower alkyl, phenyl, lower alkyl phenyl and phenyl lower alkyl and X is selected from the group consisting of $$\overset{|}{\underset{|}{C}}=O \quad \text{and} \quad H\overset{|}{\underset{|}{C}}OH$$

The new steroids encompassed within Formula I above are prepared according to the method of the present invention by the condensation of an isatoic anhydride with funtumine or funtumidine according to the following reaction:

(II) + (III) → (I)

As will be readily apparent from the foregoing reaction, the product identified by numeral I corresponds to the product encompassed within Formula I as set forth above.

As has been suggested, these new compounds may be prepared by reacting isatoic anhydride or a suitably substituted derivative thereof (II) with funtumine $$(X=\overset{|}{\underset{|}{C}}=O)$$

or funtumidine $$(X=H\overset{|}{\underset{|}{C}}OH)$$

(III). Both starting reactants, i.e. the anhydride and the steroid, are known to those skilled in the art or are readily preparable by known methods. The isatoic anhydride is prepared by reacting anthranilic acid with phosgene. It is of course understood that a suitably substituted anthranilic acid will be required to produce the desired anhydride having substituents encompassed within those defined by Formula I. In carrying out this reaction, phosgene is bubbled through the amino acid dissolved or suspended in a solvent such as dioxane, with the resulting anhydride being crystallized out on addition of a suitable agent such as benzene. Similarly, funtumine or funtumidine, which may be identified as 3α-amino-5α-pregnan-20-one and 3α-amino-5α-pregnan-20-ol respectively may be prepared according to known methods such as is described in Compt. rend. Acad. Sci. 240, 3076, 1958.

In carrying out the preparation of these new compounds according to the method of the present invention, funtumine or funtumidine in a suitable solvent such as for example dioxane, methanol, ethyl acetate, dimethylformamide and the like or a mixture of such solvents, are heated for a period of from about 0.5 to 40 hours. The mixture is then concentrated to dryness, washed and crystallized from a suitable solvent such as ethyl acetate or a low molecular weight alkanol solvent.

The new steroids of the present invention have valuable anti-inflammatory activity and are therefore useful for this purpose. When utilized for this purpose, the new steroids may be administered alone or in combination with pharmaceutically acceptable carriers the quantity of which is determined by the solubility and chemical nature of the compound, the chosen route of administration and standard pharmaceutical practice. The steroids may be administered in dosage amounts determined by a physician, which amounts will vary with the particular compound chosen and the particular patient under treatment. A physician utilizing these compounds shall preferably administer these compounds in small dosages and increase these dosages until the optimum dosage level for a particular patient has been reached. In view of their anti-inflammatory activity, the new steroids of this invention may be administered in the same manner as cortisone, hydrocortisone or similar steroidal products.

Reference now to the examples which follow will provide a better understanding of the method of the present invention and the new steroidal products obtainable thereby.

Example I

Ten grams of crude funtumine was stirred with 150 ml. of dioxane and filtered. The filtrate was refluxed with 3.8 grams of isatoic anhydride for 4½ hours, and the solution was then evaporated to dryness. The residue was washed with two 50 ml. volumes of ethyl ether and then crystallized from ethyl acetate, giving 3.5 grams of 3α-(o-aminobenzamido)-5α-pregnan-20-one.

Example II

Following the method of Example I, funtumidine is reacted with 6-nitroisatoic anhydride to produce 3α-(2-amino-5-nitrobenzamido)-5α-pregnan-20-ol.

Example III

According to the method of Example I, 3α-(2-ethylamino-3,5-dichlorobenzamido)-5α-pregnan-20-one is prepared by reacting N-ethyl-6,8-dichloroisatoic anhydride with funtumine.

Example IV

Following the method of Example I, funtumidine is reacted with N-phenyl-6-bromoisatoic anhydride to produce 3α-(2-phenylamino-5-bromobenzamido)-5α-pregnan-20-ol.

Example V

Following the procedure of Example I, funtumine is reacted with 6,8-dimethylisatoic anhydride to produce 3α-(2-amino-3,5-dimethylbenzamido)-5α-pregnan-20-one.

Example VI

One gram of crude funtumine was extracted by 25 ml. of dioxane. The extract was mixed with 500 mg. of 6-chloroisatoic anhydride, and the solution was heated at 100° C. for 4 hours. It was concentrated to dryness, washed with ether, and crystallized from hot 50% ethanol. The product, 3α-(2-amino-5-chlorobenzamido)-5α-pregnan-20-one, weighing 0.5 gram, melted at 180–184 with decomposition. Utilizing funtumidine in lieu of funtumine in this reaction results in 3α-(2-amino-5-chlorobenzamido)-5α-pregnan-20-ol.

Example VII

According to the method of previous examples, 3α-(2-phenethylamino-5-propylbenzamido)-5α-pregnan-20-one is prepared by refluxing a solution of funtumine with N-phenethyl-6-propylisatoic anhydride.

Example VIII

According to the method of previous examples, 3α-(2-methylamino-3-methylbenzamido)-5α-pregnan-20-one is prepared by reacting funtumine with N-methyl-8-methylisatoic anhydride.

Example IX

To prepare 3α-(2-amino-5-sulfobenzamido)-5α-pregnan-20-one, funtumine is reacted with 6-sulfoisatoic anhydride according to the method previously described.

Example X

To prepare 3α-(2-amino-5-methyl-3-chlorobenzamido)-5α-pregnan-20-ol, funtumidine is reacted with 6-methyl-8-chloroisatoic anhydride according to the method previously described.

Example XI

Following the procedure of previous examples, funtumine is reacted with N-methyl-6-phenylisatoic anhydride to produce 3α-(2-methylamino-5-phenylbenzamido)-5α-pregnan-20-one.

Example XII

Following the procedure of previous examples, funtumine is reacted with N-methyl-6,8-dimethylisatoic anhydride to obtain 3α-(2-methylamino-3,5-dimethylbenzamido)-5α-pregnan-20-one.

While the foregoing invention has been described with some degree of particularity in the specific examples set forth above, it is to be understood that the invention is not to be limited thereby but is only to be limited by the claims appended hereto.

The invention claimed is:

1. A compound having the formula:

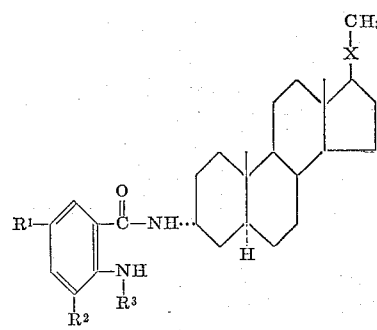

wherein $R^1$ and $R^2$ are selected from the group consisting of hydrogen, lower alkyl, phenyl, halogen, nitro and sulfo and $R^3$ is selected from the group consisting of hydrogen, lower alkyl, phenyl, lower alkyl phenyl and phenyl lower alkyl and X is selected from the group consisting of

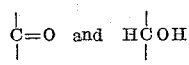

2. 3α-(o-aminobenzamido)-5α-pregnan-20-one.
3. 3α-(2-phenylamino-5-bromobenzamido)-5α-pregnan-20-ol.
4. 3α-(2-amino-3,5-dimethylbenzamido)-5α-pregnan-20-one.
5. 3α-(2-amino-5-chlorobenzamido)-5α-pregnan-20-one.
6. 3α-(2-methylamino-3-methylbenzamido)-5α-pregnan-20-one.
7. 3α-(2-amino-5-sulfobenzamido)-5α-pregnan-20-one.
8. 3α-(2-amino-5-nitrobenzamido)-5α-pregnan-20-ol.
9. The method of preparing 3α-(aminobenzamido)-5α-pregnan-20-one which comprises treating funtumine with isatoic anhydride in the presence of an inert solvent and isolating the desired product.
10. The method of preparing 3α-(aminobenzamido)-5α-pregnan-20-ol which comprises treating funtumidine with isatoic anhydride in the presence of an inert solvent and isolating the desired product.

References Cited by the Examiner

UNITED STATES PATENTS 3,053,861  9/62  Van der Burg _____ 260—397.3

LEWIS GOTTS, *Primary Examiner.*